(12) United States Patent
Chatterji et al.

(10) Patent No.: US 9,150,773 B2
(45) Date of Patent: Oct. 6, 2015

(54) COMPOSITIONS COMPRISING KILN DUST AND WOLLASTONITE AND METHODS OF USE IN SUBTERRANEAN FORMATIONS

(71) Applicant: Halliburton Energy Services, Inc., Houston, TX (US)

(72) Inventors: Jiten Chatterji, Duncan, OK (US); Darrell Chad Brenneis, Marlow, OK (US); Baya Adams, Duncan, OK (US); Craig Wayne Roddy, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/955,516

(22) Filed: Jul. 31, 2013

(65) Prior Publication Data

US 2013/0312641 A1  Nov. 28, 2013

Related U.S. Application Data

(60) Continuation-in-part of application No. 13/477,777, filed on May 22, 2012, now Pat. No. 8,895,485, which is a division of application No. 13/399,913, filed on Feb. 17, 2012, now Pat. No. 8,281,859, which is a (Continued)

(51) Int. Cl.
| | |
|---|---|
| C09K 8/46 | (2006.01) |
| C09K 8/473 | (2006.01) |
| E21B 33/13 | (2006.01) |
| C04B 28/02 | (2006.01) |
| C04B 18/16 | (2006.01) |
| C09K 8/467 | (2006.01) |
| C04B 28/04 | (2006.01) |

(52) U.S. Cl.
CPC ............... *C09K 8/46* (2013.01); *C04B 18/162* (2013.01); *C04B 28/02* (2013.01); *C04B 28/04* (2013.01); *C09K 8/467* (2013.01); *C09K 8/473* (2013.01); *E21B 33/13* (2013.01); *Y02W 30/95* (2015.05)

(58) Field of Classification Search
None
See application file for complete search history.

(56) References Cited

U.S. PATENT DOCUMENTS

| | | | |
|---|---|---|---|
| 1,931,921 | A | 10/1933 | Breerwood |
| 2,021,956 | A | 11/1935 | Gladney et al. |
| 2,045,899 | A | 6/1936 | Davis |

(Continued)

FOREIGN PATENT DOCUMENTS

| | | |
|---|---|---|
| CA | 2064682 | 4/1992 |
| CA | 2336077 | 1/2000 |

(Continued)

OTHER PUBLICATIONS

Rena Mathur, A.K. Misra and PAnkaj Goel, "Influence of Wollastonite on Mechanical Properties of Concrete", Journal of Scientific & Industrial Research, vol. 66, Dec. 2007, pp. 1029-1034.*

(Continued)

*Primary Examiner* — John J Figueroa
(74) *Attorney, Agent, or Firm* — Craig W. Roddy; Tumey L.L.P.

(57) ABSTRACT

Embodiments relate to cementing operations and, more particularly, in certain embodiments, to settable compositions that comprise kiln dust and wollastonite and methods of use in subterranean formations. An embodiment discloses a method of cementing comprising: providing a settable composition comprising kiln dust, wollastonite, and water; and allowing the settable composition to set.

18 Claims, 2 Drawing Sheets

Related U.S. Application Data continuation-in-part of application No. 13/180,238, filed on Jul. 11, 2011, now Pat. No. 8,672,028, which is a continuation-in-part of application No. 12/975,196, filed on Dec. 21, 2010, now Pat. No. 8,403,045, said application No. 13/399,913 is a continuation-in-part of application No. 12/895,436, filed on Sep. 30, 2010, now Pat. No. 8,522,873, which is a continuation-in-part of application No. 12/264,010, filed on Nov. 3, 2008, now Pat. No. 8,333,240, which is a continuation-in-part of application No. 11/223,669, filed on Sep. 9, 2005, now Pat. No. 7,445,669.

(56) References Cited

U.S. PATENT DOCUMENTS

| Patent | Type | Date | Inventor | Ref |
|---|---|---|---|---|
| 2,094,316 | A | 9/1937 | Cross et al. | |
| 2,133,622 | A | 10/1938 | Larmour et al. | |
| 2,144,254 | A | 1/1939 | Breerwood | |
| 2,193,775 | A | 3/1940 | Stratford | |
| 2,193,807 | A | 3/1940 | Dieterich | |
| 2,214,715 | A | 9/1940 | Breerwood | |
| 2,329,940 | A | 9/1943 | Ponzer | |
| 2,592,468 | A | 4/1952 | Rex et al. | |
| 2,772,739 | A | 12/1956 | Aire | |
| 2,842,205 | A | 7/1958 | Allen et al. | |
| 2,844,361 | A | 7/1958 | Dilcher et al. | |
| 2,848,051 | A | 8/1958 | Willaims | |
| 2,871,133 | A | 1/1959 | Palonen et al. | |
| 2,880,096 | A | 3/1959 | Hurley | |
| 2,945,769 | A | 7/1960 | Gama et al. | |
| 3,024,125 | A * | 3/1962 | Lee | 106/287.1 |
| 3,066,031 | A | 11/1962 | Schifferle | |
| 3,168,139 | A | 2/1965 | Kennedy et al. | |
| 3,320,077 | A | 5/1967 | Prior | |
| 3,411,580 | A | 11/1968 | Roberts et al. | |
| 3,421,703 | A | 1/1969 | Galer | |
| 3,454,095 | A | 7/1969 | Messenger et al. | |
| 3,467,193 | A | 9/1969 | McColl et al. | |
| 3,473,939 | A | 10/1969 | Mayberry et al. | |
| 3,499,491 | A | 3/1970 | Wyant et al. | |
| 3,557,876 | A | 1/1971 | Tragesser | |
| 3,574,113 | A * | 4/1971 | Shannom | 252/62 |
| 3,574,816 | A | 4/1971 | Abbdellatif et al. | |
| 3,628,973 | A | 12/1971 | Greening et al. | |
| 3,748,159 | A | 7/1973 | George | |
| 3,749,173 | A | 7/1973 | Hill et al. | |
| 3,863,718 | A | 2/1975 | Bruist | |
| 3,876,005 | A | 4/1975 | Fincher et al. | |
| 3,887,009 | A | 6/1975 | Miller et al. | |
| 3,887,385 | A | 6/1975 | Quist et al. | |
| 3,921,717 | A | 11/1975 | Danjushevsky et al. | |
| 3,959,007 | A | 5/1976 | Pitt | |
| 4,018,617 | A | 4/1977 | Nicholson | |
| 4,018,619 | A | 4/1977 | Webster et al. | |
| 4,031,184 | A | 6/1977 | McCord | |
| 4,036,301 | A | 7/1977 | Powers et al. | |
| 4,083,407 | A | 4/1978 | Griffin et al. | |
| 4,101,332 | A | 7/1978 | Nicholson | |
| 4,105,459 | A | 8/1978 | Mehta | |
| 4,141,843 | A | 2/1979 | Watson | |
| 4,160,674 | A | 7/1979 | Sawyer | |
| 4,176,720 | A | 12/1979 | Wilson | |
| 4,268,316 | A | 5/1981 | Wills et al. | |
| 4,274,881 | A * | 6/1981 | Langton et al. | 106/698 |
| 4,304,300 | A | 12/1981 | Watson | |
| 4,333,764 | A | 6/1982 | Richardson | |
| 4,341,562 | A | 7/1982 | Ahlbeck | |
| RE31,190 | E | 3/1983 | Detroit et al. | |
| 4,400,474 | A | 8/1983 | Copperthwaite et al. | |
| 4,407,677 | A | 10/1983 | Wills et al. | |
| 4,423,781 | A | 1/1984 | Thomas | |
| 4,432,800 | A | 2/1984 | Kneller et al. | |
| 4,435,216 | A | 3/1984 | Diehl et al. | |
| 4,436,850 | A | 3/1984 | Burdick et al. | |
| 4,440,576 | A * | 4/1984 | Flannery et al. | 106/814 |
| 4,460,292 | A | 7/1984 | Durham et al. | |
| 4,462,835 | A * | 7/1984 | Car | 106/602 |
| 4,470,463 | A | 9/1984 | Holland | |
| 4,494,990 | A | 1/1985 | Harris | |
| 4,515,635 | A | 5/1985 | Rao et al. | |
| 4,519,452 | A | 5/1985 | Tsao et al. | |
| 4,555,269 | A | 11/1985 | Rao et al. | |
| 4,614,599 | A | 9/1986 | Walker | |
| 4,624,711 | A | 11/1986 | Styron | |
| 4,633,950 | A | 1/1987 | Delhommer et al. | |
| 4,676,317 | A | 6/1987 | Fry et al. | |
| 4,676,832 | A | 6/1987 | Childs et al. | |
| 4,741,782 | A | 5/1988 | Styron | |
| 4,761,183 | A | 8/1988 | Clarke | |
| 4,784,223 | A | 11/1988 | Worrall et al. | |
| 4,829,107 | A | 5/1989 | Kindt | |
| 4,883,125 | A | 11/1989 | Wilson et al. | |
| 4,941,536 | A | 7/1990 | Brothers et al. | |
| 4,992,102 | A | 2/1991 | Barbour | |
| 5,030,366 | A | 7/1991 | Wilson et al. | |
| 5,049,288 | A | 9/1991 | Brothers et al. | |
| 5,058,679 | A | 10/1991 | Hale et al. | |
| RE33,747 | E | 11/1991 | Hartley et al. | |
| 5,086,850 | A | 2/1992 | Harris et al. | |
| 5,113,943 | A | 5/1992 | Wilson et al. | |
| 5,121,795 | A | 6/1992 | Ewert et al. | |
| 5,123,487 | A | 6/1992 | Harris et al. | |
| 5,125,455 | A | 6/1992 | Harris et al. | |
| 5,127,473 | A | 7/1992 | Harris et al. | |
| 5,183,505 | A | 2/1993 | Spinney | |
| 5,183,506 | A * | 2/1993 | Zhang | 106/739 |
| 5,213,160 | A | 5/1993 | Nahm et al. | |
| 5,215,585 | A | 6/1993 | Luthra et al. | |
| 5,238,064 | A | 8/1993 | Dahl et al. | |
| 5,252,128 | A | 10/1993 | Gopalkrishnan | |
| 5,266,111 | A | 11/1993 | Barbour | |
| 5,290,355 | A | 3/1994 | Jakel et al. | |
| 5,295,543 | A | 3/1994 | Terry et al. | |
| 5,305,831 | A | 4/1994 | Nahm | |
| 5,314,022 | A | 5/1994 | Cowan et al. | |
| 5,316,083 | A | 5/1994 | Nahm et al. | |
| 5,327,968 | A | 7/1994 | Onan et al. | |
| 5,337,824 | A | 8/1994 | Cowan | |
| 5,339,902 | A | 8/1994 | Harris | |
| 5,346,012 | A | 9/1994 | Heathman | |
| 5,346,548 | A | 9/1994 | Mehta | |
| 5,352,288 | A | 10/1994 | Mallow | |
| 5,358,044 | A | 10/1994 | Hale et al. | |
| 5,358,049 | A | 10/1994 | Hale et al. | |
| 5,361,841 | A | 11/1994 | Hale et al. | |
| 5,361,842 | A | 11/1994 | Hale et al. | |
| 5,368,103 | A | 11/1994 | Heathman et al. | |
| 5,370,185 | A | 12/1994 | Cowan et al. | |
| 5,372,641 | A | 12/1994 | Carpenter | |
| 5,382,290 | A | 1/1995 | Nahm et al. | |
| 5,383,521 | A | 1/1995 | Onan et al. | |
| 5,383,967 | A | 1/1995 | Chase | |
| 5,398,758 | A | 3/1995 | Onan et al. | |
| 5,417,759 | A | 5/1995 | Huddleston | |
| 5,421,409 | A * | 6/1995 | Mueller et al. | 166/292 |
| 5,423,379 | A | 6/1995 | Hale et al. | |
| 5,430,235 | A | 7/1995 | Hooykaas et al. | |
| 5,439,056 | A | 8/1995 | Cowan | |
| 5,456,751 | A | 10/1995 | Zandi et al. | |
| 5,458,195 | A | 10/1995 | Totten et al. | |
| 5,464,060 | A | 11/1995 | Hale et al. | |
| 5,472,051 | A | 12/1995 | Brothers | |
| 5,476,144 | A | 12/1995 | Nahm et al. | |
| 5,478,391 | A | 12/1995 | Babaev et al. | |
| 5,484,019 | A | 1/1996 | Griffith | |
| 5,494,513 | A | 2/1996 | Fu et al. | |
| 5,499,677 | A | 3/1996 | Cowan | |
| 5,515,921 | A | 5/1996 | Cowan et al. | |
| 5,518,996 | A | 5/1996 | Maroy et al. | |
| 5,520,730 | A | 5/1996 | Barbour | |
| 5,529,123 | A | 6/1996 | Carpenter et al. | |
| 5,529,624 | A | 6/1996 | Riegler | |
| 5,536,311 | A | 7/1996 | Rodrigues | |

(56) References Cited

U.S. PATENT DOCUMENTS

| | | |
|---|---|---|
| 5,542,782 A | 8/1996 | Carter et al. |
| 5,554,352 A | 9/1996 | Jaques et al. |
| 5,569,324 A | 10/1996 | Totten et al. |
| 5,571,318 A | 11/1996 | Griffith |
| 5,580,379 A | 12/1996 | Cowan |
| 5,584,926 A | 12/1996 | Borgholm et al. |
| 5,585,333 A | 12/1996 | Dahl et al. |
| 5,588,489 A | 12/1996 | Chatterji et al. |
| 5,626,665 A | 5/1997 | Barger et al. |
| 5,641,584 A | 6/1997 | Andersen et al. |
| 5,673,753 A | 10/1997 | Hale et al. |
| 5,681,384 A | 10/1997 | Liskowitz |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,788,762 A | 8/1998 | Barger et al. |
| 5,795,924 A | 8/1998 | Chatterji et al. |
| 5,820,670 A | 10/1998 | Chatterji et al. |
| 5,851,960 A | 12/1998 | Totten et al. |
| 5,866,516 A | 2/1999 | Costin |
| 5,866,517 A | 2/1999 | Carpenter et al. |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A | 8/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 * | 5/2001 | Mueller et al. ................ 166/293 |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,264,738 B1 | 7/2001 | Lorke et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,328,106 B1 | 12/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,416,574 B1 | 7/2002 | Steelhammer et al. |
| 6,451,104 B2 | 9/2002 | Mehta |
| 6,457,524 B1 | 10/2002 | Roddy et al. |
| 6,478,869 B2 | 11/2002 | Reddy et al. |
| 6,478,870 B2 | 11/2002 | Marko |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,502,634 B1 | 1/2003 | Evans et al. |
| 6,508,305 B1 | 1/2003 | Brannon et al. |
| 6,516,884 B1 | 2/2003 | Chatterji et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Reddy et al. |
| 6,626,243 B1 | 9/2003 | Go Boncan |
| 6,641,658 B1 | 11/2003 | Dubey |
| 6,645,289 B2 | 11/2003 | Sobolev et al. |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,927 B1 | 12/2003 | Chatterji et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,708,760 B1 | 3/2004 | Chatterji et al. |
| 6,715,568 B1 | 4/2004 | Bailey |
| 6,716,282 B2 | 4/2004 | Griffith et al. |
| 6,729,405 B2 * | 5/2004 | DiLullo et al. ................ 166/292 |
| 6,749,679 B2 | 6/2004 | Shi |
| 6,755,905 B2 | 6/2004 | Oates |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,840,318 B2 | 1/2005 | Lee |
| 6,840,996 B2 | 1/2005 | Morioka et al. |
| 6,846,357 B2 | 1/2005 | Reddy et al. |
| 6,848,519 B2 | 2/2005 | Reddy et al. |
| 6,869,474 B2 | 3/2005 | Perez-Pena |
| 6,869,475 B1 * | 3/2005 | Krowl ............................ 106/797 |
| 6,874,578 B1 | 4/2005 | Garnier |
| 6,883,609 B2 | 4/2005 | Drochon |
| 6,887,833 B2 | 5/2005 | Brothers et al. |
| 6,889,767 B2 | 5/2005 | Reddy et al. |
| 6,899,177 B2 | 5/2005 | Chatterji et al. |
| 6,904,971 B2 | 6/2005 | Brothers et al. |
| 6,908,507 B2 | 6/2005 | Lalande et al. |
| 6,908,508 B2 | 6/2005 | Brothers |
| 6,911,078 B2 | 6/2005 | Barlet-Gouedard et al. |
| 6,964,302 B2 | 11/2005 | Luke et al. |
| 6,989,057 B2 | 1/2006 | Getzlaf et al. |
| 7,022,755 B1 | 4/2006 | Chatterji et al. |
| 7,048,053 B2 | 5/2006 | Santra et al. |
| 7,055,603 B2 | 6/2006 | Caveny et al. |
| 7,073,584 B2 | 7/2006 | Reddy et al. |
| 7,073,585 B2 | 7/2006 | Morgan et al. |
| 7,077,203 B1 | 7/2006 | Roddy et al. |
| 7,096,944 B2 | 8/2006 | Vargo et al. |
| 7,101,829 B2 | 9/2006 | Guichard |
| 7,137,446 B2 | 11/2006 | Gagliano et al. |
| 7,140,439 B2 | 11/2006 | Luke et al. |
| 7,140,440 B2 | 11/2006 | Luke et al. |
| 7,143,827 B2 | 12/2006 | Chatterji et al. |
| 7,147,055 B2 | 12/2006 | Brothers et al. |
| 7,147,067 B2 | 12/2006 | Getzlaf et al. |
| 7,150,321 B2 | 12/2006 | Luke et al. |
| 7,156,173 B2 | 1/2007 | Mueller |
| 7,156,174 B2 | 1/2007 | Roddy |
| 7,174,962 B1 | 2/2007 | Roddy et al. |
| 7,178,597 B2 | 2/2007 | Reddy |
| 7,182,137 B2 | 2/2007 | Fyten et al. |
| 7,198,104 B2 | 4/2007 | Griffith et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,217,441 B2 | 5/2007 | Bour et al. |
| 7,219,733 B2 | 5/2007 | Luke et al. |
| 7,255,739 B2 | 8/2007 | Brothers et al. |
| 7,284,609 B2 | 10/2007 | Roddy et al. |
| 7,284,611 B2 | 10/2007 | Reddy |
| 7,284,930 B2 | 10/2007 | Shi et al. |
| 7,285,164 B2 | 10/2007 | Luke et al. |
| 7,293,609 B2 | 11/2007 | Dealy et al. |
| 7,297,664 B2 | 11/2007 | Santra et al. |
| 7,303,008 B2 | 12/2007 | Badalamenti et al. |
| 7,303,015 B2 | 12/2007 | Fyten et al. |
| 7,316,744 B2 | 1/2008 | De La Roij et al. |
| 7,325,611 B2 | 2/2008 | Santra et al. |
| 7,326,291 B2 | 2/2008 | Fyten |

(56) References Cited

U.S. PATENT DOCUMENTS

| | | |
|---|---|---|
| 7,332,026 B2 | 2/2008 | Fyten |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,341,105 B2 | 3/2008 | Bingamon |
| 7,350,573 B2 | 4/2008 | Reddy |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,855 B2 | 7/2008 | Chatterji et al. |
| 7,409,990 B1 | 8/2008 | Burts et al. |
| 7,413,014 B2 | 8/2008 | Chatterji et al. |
| 7,424,914 B2 | 9/2008 | Reddy |
| 7,442,249 B2 | 10/2008 | Mueller |
| 7,445,669 B2 | 11/2008 | Roddy et al. |
| 7,478,675 B2 | 1/2009 | Roddy et al. |
| 7,488,705 B2 | 2/2009 | Reddy |
| 7,493,968 B2 | 2/2009 | Reddy |
| 7,527,688 B2 | 5/2009 | Bingamon et al. |
| 7,537,054 B2 | 5/2009 | Reddy |
| 7,544,640 B2 | 6/2009 | Luke et al. |
| 7,607,482 B2 | 10/2009 | Roddy et al. |
| 7,607,484 B2 | 10/2009 | Roddy et al. |
| 7,612,021 B2 | 11/2009 | Chatterji |
| 7,627,870 B1 | 12/2009 | Michaeli et al. |
| 7,631,692 B2 | 12/2009 | Roddy et al. |
| 7,647,970 B2 | 1/2010 | Mueller |
| 7,651,563 B2 | 1/2010 | Datta et al. |
| 7,655,088 B2 | 2/2010 | Bethani |
| 7,658,796 B2 | 2/2010 | Nordmeyer |
| 7,674,332 B2 | 3/2010 | Roddy et al. |
| 7,712,527 B2 | 5/2010 | Roddy |
| 7,740,070 B2 | 6/2010 | Santra et al. |
| 7,741,841 B2 | 6/2010 | Edwards et al. |
| 7,743,828 B2 | 6/2010 | Roddy et al. |
| 7,748,454 B2 | 7/2010 | Reddy et al. |
| 7,762,329 B1 | 7/2010 | Morgan |
| 7,784,542 B2 | 8/2010 | Roddy et al. |
| 7,789,150 B2 | 9/2010 | Roddy et al. |
| 7,815,880 B2 | 10/2010 | Constantz et al. |
| 7,837,412 B2 | 11/2010 | O'Hearn |
| 7,867,954 B2 | 1/2011 | Warrender et al. |
| 7,887,694 B2 | 2/2011 | Constantz et al. |
| 7,919,064 B2 | 4/2011 | Kawatra et al. |
| 7,922,809 B1 | 4/2011 | Constantz et al. |
| 7,927,419 B2 | 4/2011 | Roddy |
| 7,939,336 B2 | 5/2011 | Constantz et al. |
| 7,963,323 B2 | 6/2011 | Bailey et al. |
| 7,993,451 B2 | 8/2011 | Brouillette et al. |
| 8,006,446 B2 | 8/2011 | Constantz et al. |
| 8,012,582 B2 | 9/2011 | Luo |
| 8,029,618 B2 | 10/2011 | Al-Shafei |
| 8,030,253 B2 | 10/2011 | Roddy et al. |
| 8,039,253 B2 | 10/2011 | Asou et al. |
| 8,062,999 B2 | 11/2011 | Reddy |
| 8,123,852 B2 | 2/2012 | Reddy |
| 8,143,198 B2 | 3/2012 | Lewis et al. |
| 8,162,055 B2 | 4/2012 | Lewis et al. |
| 8,183,186 B2 | 5/2012 | Luo |
| 8,261,827 B2 | 9/2012 | Roddy |
| 8,261,833 B2 | 9/2012 | Desai |
| 8,281,859 B2 | 10/2012 | Roddy |
| 8,297,357 B2 | 10/2012 | Brenneis |
| 8,307,899 B2 | 11/2012 | Brenneis |
| 8,318,642 B2 | 11/2012 | Roddy |
| 8,324,137 B2 | 12/2012 | Roddy et al. |
| 8,327,939 B2 | 12/2012 | Roddy |
| 8,333,240 B2 | 12/2012 | Roddy |
| 8,342,242 B2 | 1/2013 | Roddy et al. |
| 8,383,558 B2 | 2/2013 | Reddy |
| 8,394,744 B2 | 3/2013 | Woytowich et al. |
| 8,399,387 B2 | 3/2013 | Roddy |
| 8,403,045 B2 | 3/2013 | Brenneis et al. |
| 8,434,553 B2 | 5/2013 | Brenneis |
| 8,440,596 B2 | 5/2013 | Brenneis |
| 8,470,275 B2 | 6/2013 | Constantz et al. |
| 8,486,868 B2 | 7/2013 | Brenneis et al. |
| 8,486,869 B2 | 7/2013 | Brenneis et al. |
| 8,505,629 B2 | 8/2013 | Benkley et al. |
| 8,505,630 B2 | 8/2013 | Chatterji |
| 8,522,873 B2 | 9/2013 | Benkley et al. |
| 8,544,543 B2 | 10/2013 | Chatterji et al. |
| 8,551,923 B1 | 10/2013 | Benkley et al. |
| 8,554,543 B2 | 10/2013 | Cherepanov et al. |
| 8,555,967 B2 | 10/2013 | Chatterji et al. |
| 8,557,036 B1 * | 10/2013 | Chatterji et al. .............. 106/470 |
| 8,672,028 B2 | 3/2014 | Karcher et al. |
| 8,691,737 B2 | 4/2014 | Chatterji et al. |
| 2002/0117090 A1 | 8/2002 | Ku |
| 2003/0116887 A1 | 6/2003 | Scott |
| 2004/0187740 A1 | 9/2004 | Timmons |
| 2004/0194960 A1 | 10/2004 | DiLullo |
| 2004/0256102 A1 | 12/2004 | Trato |
| 2005/0166803 A1 | 8/2005 | Dillenbeck |
| 2006/0166834 A1 | 7/2006 | Roddy |
| 2007/0056479 A1 | 3/2007 | Gray |
| 2007/0137528 A1 | 6/2007 | LeRoy-Delage et al. |
| 2008/0229979 A1 | 9/2008 | Lewis |
| 2008/0300149 A1 | 12/2008 | Reddy et al. |
| 2009/0124522 A1 | 5/2009 | Roddy et al. |
| 2009/0169452 A1 * | 7/2009 | Constantz et al. ............ 423/230 |
| 2009/0202410 A1 * | 8/2009 | Kawatra et al. ............... 423/232 |
| 2010/0025039 A1 | 2/2010 | Roddy et al. |
| 2010/0044057 A1 | 2/2010 | Dealy et al. |
| 2010/0081584 A1 | 4/2010 | Perez |
| 2010/0196104 A1 | 8/2010 | Constantz et al. |
| 2010/0258035 A1 | 10/2010 | Constantz et al. |
| 2010/0273912 A1 | 10/2010 | Roddy et al. |
| 2010/0282466 A1 | 11/2010 | Brenneis et al. |
| 2010/0294496 A1 * | 11/2010 | Woytowich et al. .......... 166/285 |
| 2011/0000400 A1 | 1/2011 | Roddy |
| 2011/0017452 A1 | 1/2011 | Benkley et al. |
| 2011/0073311 A1 | 3/2011 | Porcherie |
| 2011/0297378 A1 | 12/2011 | Reddy et al. |
| 2012/0012315 A1 | 1/2012 | Woytowich et al. |
| 2012/0145387 A1 | 6/2012 | Pyatina et al. |
| 2012/0152539 A1 | 6/2012 | Karcher |
| 2012/0167803 A1 | 7/2012 | Luo |
| 2012/0227631 A1 | 9/2012 | Brenneis et al. |
| 2012/0285682 A1 | 11/2012 | Santra et al. |
| 2012/0291674 A1 | 11/2012 | Brenneis et al. |
| 2012/0318506 A1 | 12/2012 | Benkley |
| 2012/0325476 A1 | 12/2012 | Brenneis |
| 2012/0328377 A1 | 12/2012 | Brenneis |
| 2013/0008352 A1 | 1/2013 | Roddy |
| 2013/0048286 A1 | 2/2013 | Morgan |
| 2013/0069755 A1 | 3/2013 | Ikriannikov |
| 2013/0118752 A1 | 5/2013 | Hannegan et al. |
| 2013/0126159 A1 | 5/2013 | Bryan et al. |
| 2013/0153214 A1 | 6/2013 | Roddy et al. |
| 2013/0157903 A1 | 6/2013 | Benkley et al. |
| 2013/0210685 A1 | 8/2013 | Chatterj |
| 2013/0213642 A1 | 8/2013 | Chatterji |
| 2013/0213643 A1 | 8/2013 | Chatterji |
| 2013/0233538 A1 | 9/2013 | Chatterji et al. |
| 2013/0244911 A1 | 9/2013 | Benkley et al. |
| 2014/0048266 A1 | 2/2014 | Morgan et al. |
| 2014/0060389 A1 | 3/2014 | Chatterji et al. |
| 2014/0076204 A1 | 3/2014 | Brenneis et al. |
| 2014/0123879 A1 | 5/2014 | Karcher et al. |

FOREIGN PATENT DOCUMENTS

| | | |
|---|---|---|
| CA | 2153372 | 1/2006 |
| CA | 2736148 | 5/2012 |
| CN | 1054620 C | 11/1997 |
| CN | 1165849 | 11/1997 |
| CN | 1182062 | 5/1998 |
| CN | 1443727 | 9/2003 |
| EP | 0752048 | 1/1997 |
| EP | 0814067 | 12/1997 |
| EP | 1092693 | 4/2001 |

(56) References Cited

FOREIGN PATENT DOCUMENTS

| EP | 1236701 | 9/2002 |
|---|---|---|
| EP | 1394137 | 7/2003 |
| EP | 1348831 | 10/2003 |
| EP | 1900703 | 3/2008 |
| EP | 2075303 | 7/2009 |
| EP | 1853680 | 4/2010 |
| EP | 2273063 | 1/2011 |
| EP | 1769132 | 4/2011 |
| EP | 2391692 | 12/2011 |
| GB | 1469954 | 4/1997 |
| GB | 2455446 | 6/2009 |
| JP | 52117316 | 10/1977 |
| JP | 55027881 | 2/1990 |
| JP | 10110487 | 4/1998 |
| KR | 1126647 | 3/2012 |
| RU | 2026959 | 1/1995 |
| RU | 2003136028 | 5/2005 |
| SU | 1373781 | 2/1988 |
| WO | WO 83/01443 | 4/1983 |
| WO | 93/21122 | 10/1993 |
| WO | WO 95/27122 | 10/1995 |
| WO | WO 97/21637 | 6/1997 |
| WO | WO 98/54108 | 12/1998 |
| WO | WO 00/63134 | 1/2000 |
| WO | WO 03/031364 | 4/2003 |
| WO | WO 2004/101951 | 11/2004 |
| WO | WO 2004/101952 | 11/2004 |
| WO | WO 2005/047212 | 5/2005 |
| WO | WO 2005/061846 | 7/2005 |
| WO | WO 2006/032841 | 3/2006 |
| WO | 2006/074946 | 7/2006 |
| WO | WO 2007/028952 | 3/2007 |
| WO | WO 2007/041841 | 4/2007 |
| WO | WO 2007/048999 | 5/2007 |
| WO | WO 2007/128945 | 11/2007 |
| WO | 2009/071962 | 11/2009 |
| WO | WO 2009/138747 | 11/2009 |
| WO | WO 2010/086592 | 8/2010 |
| WO | 2011051664 | 5/2011 |
| WO | 2012/001343 | 1/2012 |

OTHER PUBLICATIONS

Sugama, "Carbonation of Hydrothermally Treated Phosphate-Bonded Calcium Aluminate Cements", pp. 1-9, 1973.
Herndon, "Setting Downhole Plugs: A State-of-the-Art", Petroleum Engineer International, Apr. 1978.
Morgan, R.G., Suter, D.A., and Sweat, V.A., "Mathematical Analysis of a Simple Back Extrusion Rheometer," ASAE Paper No. 79-6001, Jun. 24, 1979.
"API Specification for Materials and Testing for Well Cements", API Spec. 10, 5th ed., pp. 7, 19-21, Jul. 1, 1980.
Sersale, "Portland-Zeolite-Cement for Minimizing Alkali-Aggregate Expansion", 1987.
Smith, "Cementing" Society of Professional Engineers, pp. 14, 38, 1987.
Nelson, "Well Cementing", 1990.
Smith, "Cementing" Society of Petroleum Engineers, p. 38, 1990.
"Appendix A", API RP 13B-2, 2d ed.; pp. 6-8, Dec. 1, 1991.
Sugama, "Carbonation of Hydrothermally Treated Phosphate Bonded Calcium Aluminate Cements," pp. 1-10, 1992.
Vinson, "Acid Removable Cement System Helps Lost Circulation in Productive Zones", IADC/SPE 23929, Feb. 18, 1992.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
Janotka, "The Properties of Mortar Using Blends With Portland Cement Clinker, Zeolite Tuff and Gypsum", 1995.
"Manufacture of supplementary cementitious materials from cement kiln dust", Mishulovich et al., World Cement Research and Development, p. 116-120, Mar. 1996.
Sugama, "Hot Alkali Carbonation of Sodium Metaphosphate Modified Fly Ash/Calcium Aluminate Blend Hydrothermal Cements", pp. 1661-1672, Sep. 11, 1996.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Naiqian, "Study on the Suppression Effect of Natural Zeolite on Expansion of Concrete Due to Alkali-Aggregate Reaction", 1998.
Chan, Comparative Study of the Initial Surface Absorption and Chloride Diffusion of High Performance Zeolite Silica Fume and PFA concretes, 1999.
Poon, "A Study of the Hydration of Natural Zeolite Blended Cement Pastes", 1999.
Ding, "Extreme Vertices Design of Concrete With Combined Mineral Admixtures", 1999.
Feng, "Zeolite Ceramiste Cellular Concrete", 2000.
Bartlet-Gouedard, "A Non-Conventional Way of Developing Cement Slurry for Geothermal Wells", 2001.
TXI Material Safety Data Sheet for Pressur-Seal, Oct. 2003.
"Kiln Dusts", Apr. 14, 2005.
"Beneficial use of Solid Waste in Maine", Apr. 14, 2005.
"Standards for the Management of Cement Kiln Dust Waste", Apr. 14, 2005.
"Use of Cement Kiln Dust for the Stabilization of Soils", R. L. Parsons, et al., Apr. 14, 2005.
"Alkali-activated binders by use of industrial by-products", Buchwald et al., Cement and concrete Research 35, p. 968-973, 2005.
Answer 3 of 24 Chemical Abstracts on STN "Effect of cement kiln dust substitution on chemical and physical properties and compressive strength of Portland and slag cements", Adb El-aleem et al. (abstract only), 2005.
Adaska and Taubert, "Beneficial Uses of Cement Kiln Dust", 2008 IEEE/PCA $50^{th}$ Cement Industry technical Conference, Miami, Fl, May 19-22, 2008, pp. 1-19, 2008.
"Fly Ash Resource Center-Pozzolan," available at http://www.rmajko.com/pozzolan.htm, Apr. 20, 2009.
Suyan, "An innovative Material for Severe Lost Circulation Control in Depleted Formations" SPE/IADC 125693, Oct. 2009.
Clinker (Cement), Wikipedia, printed from the Internet on Aug. 23, 2013, available at http://en.wikipedia.org/wiki/Clinker_(cement), Aug. 23, 2013.
HES Brochure "SCR-100 Cement Retarder a Valuable Time Saver", 1994.
HES Brochure "Halad-344 Fluid Loss Additive", 1998.
HES Brochure "HR-5 Cement Additive", 1998.
HES Brochure "AQF-2 Foaming Agent", 1999.
HES Brochure "ThermaLock™ Cement for Corrosive $CO_2$ Environments", 1999.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-7 Cement Retarder", 1999.
HES Brochure "Pozmix A Cement Additive", 1999.
HES Brochure "Pozmix Cement and Pozmix 140", 1999.
HES Brochure "SCR-100™ Cement Retarder", 1999.
HES Brochure "SCR-500L High Temp Retarder", 2000.
HES Brochure "Halad-23 Fluid Loss Additive", 2000.
HES Brochure "Thermatek Service", May 2005.
HES Brochure "Micro Matrix ® Cement", Nov. 2006.
HES Brochure "VersaCem™ Cement", Jan. 2007.
HES Brochure "Tuned Spacer™ III", Apr. 2007.
HES Brochure "HR®-5", Aug. 2007.
HES Brochure "Econolite™ Additive for Cement Slurries", Aug. 2007.
HES Brochure "SSA-1™ Strength-Stabilizing Agent", Aug. 2007.
HES Brochure "SSA-2™ Coarse Silica Flour", Aug. 2007.
BASF Technical Bulletin "MetaMax® PA", Aug. 2007.
HES Brochure "Silicalite™", Aug. 2007.
HES Brochure "SCR-100™ Cement Retarder" Aug. 2007.

(56) References Cited

OTHER PUBLICATIONS

HESS Pumice Products Inc., Fact Sheet for "DS-200", "DS-325", and "Ultrafine Grout", Aug. 2007.
HES Brochure "Cal-Seal™ Cement Accelerator", Aug. 2007.
HES Brochure "D-Air 4000L™ Cementing Defoamer", Sep. 2007.
HES Brochure "WG-17 LXP™ Free-Water Control Agent", Dec. 2007.
HES Brochure "HR®-601 Cement Retarder", Jan. 2008.
HES Brochure "Thermatek® RSP Rapid Set Plug Service", Mar. 2008.
HES Product Data Sheet "Baroid®", Mar. 25, 2010.
HES Brochure "Enhancer 923™ Cement Agent", 2010.
HES Brochure "Enhancer 923™ Agent—Successes from the Field", 2010.
HES Brochure "Latex 3000™ Cement Additive", Jun. 2010.
HES Brochure "Foamer 760™ Foamer/Stabilizer", Aug. 2010.
HES Brochure "Tumed® Spacer IV", Aug. 2010.
HES Brochure "Tuned® Spacer V", Dec. 2010.
HES Brochure "D-Air 5000™ Defoamer", Aug. 2011.
HES Brochure "WellLife® III Cementing Service" Jan. 2012.
HES Brochure "SA-1015™ Suspending Agent", Mar. 2012.
HES Brochure "CFR-3™ and CFR-3L™ Dispersant", Apr. 2012.
HES Brochure "TergoVis™ I efficiency fluid", Apr. 2013.
HES ZoneSealant™ 2000, printed from the Internet on Sep. 9, 2013, available at http://www.halliburton.com/en-US/ps/cementing/materials-chemicals-additives/agents/foamer/zonesealant-2000-agent.page, Sep. 9, 2013.
"3M Scotchlite, Glass Bubbles Floated Product Series Product Information", 1999.
LaFarge brochure "TerraCem™", Aug. 2006.
LaFarge MSDS "Cement Kiln Dust", Mar. 3, 2005.
LaFarge MSDS "LaFarge Blended Cement (cement)", Mar. 3, 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Office Action from U.S. Appl. No. 12/263,800, May 1, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
Office Action from U.S. Appl. No. 12/349,676, Nov. 4, 2009.
Office Action from U.S. Appl. No. 12/606,381, Mar. 23, 2010.
Office Action from U.S. Appl. No. 12/609,993, Apr. 9, 2010.
Office Action from U.S. Appl. No. 12/609,993, Jun. 15, 2010.
Office Action from U.S. Appl. No. 12/558,097, Jun. 30, 2010.
Notice of Allowance from U.S. Appl. No. 12/609,993, Jul. 26, 2010.
Office Action from U.S. Appl. No. 12/558,097, Sep. 3, 2010.
Office Action from U.S. Appl. No. 12/844,612, Oct. 1, 2010.
Office Action from U.S. Appl. No. 12/833,189, Oct. 1, 2010.
Office Action from U.S. Appl. No. 12/844,612, Jan. 28, 2011.
Notice of Allowance from U.S. Appl. No. 12/544,915, Aug. 1, 2011.
Office Action from U.S. Appl. No. 12/844,612, Sep. 6, 2011.
Office Action from U.S. Appl. No. 12/264,010, Oct. 31, 2011.
Office Action from U.S. Appl. No. 12/844,612, Dec. 23, 2011.
Final Office Action from U.S. Appl. No. 12/264,010, Apr. 10, 2012.
Office Action from U.S. Appl. No. 12/844,612, Apr. 11, 2012.
Office Action from U.S. Appl. No. 13/399,913, May 15, 2012.
Office Action from U.S. Appl. No. 13/447,560, May 31, 2012.
Office Action from U.S. Appl. No. 12/821,412, Jun. 5, 2012.
Office Action from U.S. Appl. No. 12/825,004, Jun. 14, 2012.
Notice of Allowance from U.S. Appl. No. 13/447,560, Jun. 21, 2012.
Office Action from U.S. Appl. No. 13/479,476, Jul. 2, 2012.
Office Action from U.S. Appl. No. 12/975,196, Jul. 3, 2012.
Final Office Action from U.S. Appl. No. 12/844,612, Jul. 30, 2012
Notice of Allowance from U.S. Appl. No. 13/399,913, Aug. 23, 2012.
Notice of Allowance from U.S. Appl. No. 13/535,258, Sep. 7, 2012.
Notice of Allowance from U.S. Appl. No. 13/825,004, Sep. 20, 2012.
Office Action from U.S. Appl. No. 13/477,777, Oct. 15, 2012.
Office Action from U.S. Appl. No. 13/560,406, Oct. 17, 2012.
Notice of Allowance from U.S. Appl. No. 13/844,612, Oct. 18, 2012.
Office Action from U.S. Appl. No. 13/555,624, Oct. 19, 2012.
Final Office Action from U.S. Appl. No. 12/975,196, Oct. 23, 2012.
Office Action from U.S. Appl. No. 13/431,701, Nov. 9, 2012.
Office Action from U.S. Appl. No. 13/620,163, Nov. 9, 2012.
Office Action from U.S. Appl. No. 13/606,098, Dec. 13, 2012.
Office Action from U.S. Appl. No. 13/669,149, Dec. 19, 2012.
Office Action from U.S. Appl. No. 13/620,013, Feb. 26, 2013.
Office Action from U.S. Appl. No. 12/895,436, Apr. 4, 2013.
Office Action from U.S. Appl. No. 13/725,833, Apr. 10, 2013.
Notice of Allowance from U.S. Appl. No. 13/669,149, May 13, 2013.
Notice of Allowance from U.S. Appl. No. 13/535,145, May 24, 2013.
Office Action from U.S. Appl. No. 13/620,013, May 28, 2013.
Notice of Allowance from U.S. Appl. No. 12/895,436, May 28, 2013.
Notice of Allowance from U.S. Appl. No. 13/560,406, May 29, 2013.
Final Office Action from U.S. Appl. No. 13/477,777, May 29, 2013.
Office Action from U.S. Appl. No. 13/851,925, Jun. 6, 2013.
Office Action from U.S. Appl. No. 13/889,398, Jun. 20, 2013.
Office Action from U.S. Appl. No. 13/849,309, Jul. 2, 2013.
Office Action from U.S. Appl. No. 13/851,391, Jul. 3, 2013.
Office Action from U.S. Appl. No. 13/872,063, Jul. 12, 2013.
Office Action from U.S. Appl. No. 13/767,710, Jul. 19, 2013.
Notice of Allowance from U.S. Appl. No. 13/851,391, Jul. 31, 2013.
Notice of Allowance from U.S. Appl. No. 13/889,398, Aug. 20, 2013.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Foreign Search Report from PCT/GB2009/000295, Feb. 3, 2009.
English language translation of USSR Patent No. RU 2026959, Jan. 20, 1995.
English language translation of Foreign Office Action for Application No. RU2008113765, Jul. 6, 2009.
English language translation of Foreign Office Action for Chinese Application No. 200680042014.3, Dec. 1, 2010.
EPO Application No. 06794648.3 Examination Report, Apr. 17, 2009.
EPO Application No. 06779194.7 Examination Report, May 29, 2009.
PCT International Search Report and Written Opinion for International Application No. PCT/GB2009/000295, Jul. 30, 2009.
PCT International Search Report and Written Opinion for International Application No. PCT/GB2009/002597, Feb. 1, 2010.
PCT International Search Report and Written Opinion for International Application No. PCT/GB2009/002598, Feb. 11, 2010.

(56) References Cited

OTHER PUBLICATIONS

PCT International Search Report and Written Opinion for International Application No. PCT/GB2010/000712, Jul. 26, 2010.
PCT International Preliminary Report on Patentability for International Application No. PCT/GB2009/000295, Aug. 24, 2010.
PCT International Search Report and Written Opinion for International Application No. PCT/GB2010/001986, Jan. 19, 2011.
PCT International Search Report and Written Opinion for International Application No. PCT/GB2010/002011, Feb. 4, 2011.
PCT International Preliminary Report on Patentability (Chapter 1) for International Application No. PCT/GB2009/002018, Mar. 24, 2011.
PCT International Search Report and Written Opinion for International Application No. PCT/GB2011/000933, Sep. 22, 2011.
PCT International Search Report and Written Opinion for International Application No. PCT/GB2011/001411, Jan. 27, 2012.
PCT International Search Report for International Application No. PCT/GB2011/001749, Apr. 5, 2012.
PCT International Search Report and Written Opinion for International Application No. PCT/US2012/046117, Oct. 26, 2012.
Foreign Office Action for Canadian Patent Application No. 2621835, Oct. 2, 2009.
Foreign Office Action for Canadian Patent Application No. 2621832, Oct. 5, 2009.
Foreign Office Action for Canadian Patent Application No. 2650630, Oct. 14, 2010.
Foreign Office Action for Canadian Patent Application No. 2658155, Nov. 16, 2010.
Foreign Office Action for Canadian Patent Application No. 2736148, May 29, 2012.
Foreign Office Action for CN Application No. 200680042004.X, May 12, 2010.
Foreign Office Action for EP Application No. 06 779 199.6, Mar. 1, 2010.
Foreign Office Action for EP Application No. 06 779 191.3, Mar. 31, 2010.
Foreign Office Action for EP Application No. 06 779 194.7, Jul. 2, 2010.
Foreign Office Action for EP Application No. 06 794 646.7, Sep. 24, 2010.
Foreign Office Action for EP Application No. 09 713 469.6, Sep. 28, 2010.
Foreign Office Action for RU Application No. 2008113766, Jul. 14, 2009.
Foreign Office Action for RU Application No. 2008113766, Apr. 8, 2010.
U.S. Appl. No. 13/622,821, Sep. 19, 2012.
U.S. Appl. No. 13/672,837, Nov. 9, 2012.
U.S. Appl. No. 13/872,063, Apr. 26, 2013.
U.S. Appl. No. 13/889,398, May 8, 2013.
USPTO Notice of Allowance for U.S. Appl. No. 13/662,111 dated Oct. 21, 2013.
USPTO Final Office Action for U.S. Appl. No. 13/620,013 dated Oct. 2, 2013.
USPTO Final Office Action for U.S. Appl. No. 13/851,925 dated Sep. 20, 2013.
USPTO Office Action for U.S. Appl. No. 13/180,238 dated Sep. 25, 2013.
USPTO Final Office Action for U.S. Appl. No. 13/767,710 dated Sep. 20, 2013.
USPTO Office Action for U.S. Appl. No. 13/477,777 dated Sep. 20, 2013.
International Search Report and Written Opinion for PCT/US2013/056719 dated Oct. 25, 2013.
International Search Report and Written Opinion for PCT/US2013/048092 dated Nov. 13, 2013.
USPTO Notice of Allowance for U.S. Appl. No. 13/180,238 dated Jan. 22, 2014.
USPTO Notice of Allowance for U.S. Appl. No. 13/851,925 dated Jan. 24, 2014.
USPTO Office Action for U.S. Appl. No. 13/851,475 dated Jan. 24, 2014.
USPTO Office Action for U.S. Appl. No. 13/620,013 dated Jan. 30, 2014.
USPTO Office Action for U.S. Appl. No. 14/079,421 dated Jan. 30, 2014.
International Search Report for International Application No. PCT/US2013/057213 dated Nov. 18, 2013.
Chinese Patent Application No. 200680042004.X dated Apr. 30, 2014 and translation.
The Professional standard of the People's Republic of China, Rotary Kiln Dust Added to Cement, ZB Q 12001-84, dated Oct. 25, 1994 and translation.
USPTO Final Office Action for U.S. Appl. No. 14/079,421 dated May 30, 2014.
Toshinori Kojima et al., Reduction of CO2 Emission from Cement Manufacturing Process by Partly Substituting Silicate for Limestone, Greenhouse Gas Control Technologies, pp. 933-938, dated 1999.
Reexamination of Chinese Patent Application 200680042014.3 and translation, Jul. 3, 2014.
USPTO Office Action for U.S. Appl. No. 13/595,493 dated Jul. 23, 2014.

* cited by examiner

COMPOSITIONS COMPRISING KILN DUST AND WOLLASTONITE AND METHODS OF USE IN SUBTERRANEAN FORMATIONS

CROSS-REFERENCE TO RELATED APPLICATIONS

This application is a continuation-in-part of U.S. patent application Ser. No. 13/477,777, filed on May 22, 2012, which is a divisional of U.S. patent application Ser. No. 13/399,913, filed on Feb. 17, 2012 (now issued as U.S. Pat. No. 8,281,859), which is a continuation-in-part of U.S. patent application Ser. No. 13/180,238, filed on Jul. 11, 2011, which is a continuation-in-part of U.S. patent application Ser. No. 12/975,196, filed on Dec. 21, 2010 (now issued as 8,403,045), and U.S. patent application Ser. No. 13/399,913 is also a continuation-in-part of U.S. patent application Ser. No. 12/895,436, filed on Sep. 30, 2010, which is a continuation-in-part of U.S. patent application Ser. No. 12/264,010, filed on Nov. 3, 2008 (now issued as U.S. Pat. No. 8,333,240), which is a continuation-in-part of U.S. patent application Ser. No. 11/223,669, filed Sep. 9, 2005 (now issued as U.S. Pat. No. 7,445,669), the entire disclosures of which are incorporated herein by reference.

BACKGROUND

In general, well treatments include a wide variety of methods that may be performed in oil, gas, geothermal and/or water wells, such as drilling, completion and workover methods. The drilling, completion and workover methods may include, but are not limited to, drilling, fracturing, acidizing, logging, cementing, gravel packing, perforating and conformance methods. Many of these well treatments are designed to enhance and/or facilitate the recovery of desirable fluids from a subterranean well.

In cementing methods, such as well construction and remedial cementing, settable compositions are commonly utilized. As used herein, the term "settable composition" refers to a composition(s) that hydraulically sets or otherwise develops compressive strength. Settable compositions may be used in primary cementing operations whereby pipe strings, such as casing and liners, are cemented in well bores. In performing primary cementing, a settable composition may be pumped into an annulus between a subterranean formation and the pipe string disposed in the subterranean formation. The settable composition should set in the annulus, thereby forming an annular sheath of hardened cement (e.g., a cement sheath) that should support and position the pipe string in the well bore and bond the exterior surface of the pipe string to the walls of the well bore. Settable compositions also may be used in remedial cementing methods, such as the placement of cement plugs, and in squeeze cementing for sealing voids in a pipe string, cement sheath, gravel pack, formation, and the like. Settable compositions may also be used in surface applications, for example, construction cementing.

Settable compositions for use in subterranean formations may further include Portland cement. Portland cement generally is a major component of the cost for the settable compositions. Other components may be included in the settable composition in addition to, or in place of, the Portland cement. Such components may include fly ash, slag, shale, zeolite, metakaolin, pumice, perlite, lime, silica, rice-hull ash, micro-fine cement, lime kiln dust, and the like. However, the operating conditions for wells are becoming more challenging and demanding, and the search for new materials continues to meet these challenges.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
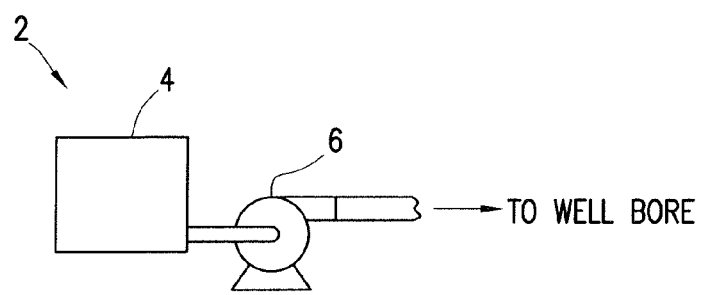
FIG. 1 illustrates a system for preparation and delivery of a settable composition to a well bore in accordance with certain embodiments.

Embodiments relate to cementing operations and, more particularly, in certain embodiments, to settable compositions that comprise kiln dust and wollastonite and methods of use in subterranean formations. In some embodiments, the settable compositions may comprise kiln dust, wollastonite, and water. One of the many potential advantages of particular embodiments is that the inclusion of the wollastonite in embodiments of the settable compositions may increase the strength of the resultant set composition. Another potential advantage of some embodiments is that the kiln dust, wollastonite, or a combination thereof may be used to reduce the amount of a higher cost component, such as Portland cement, resulting in a more economical settable composition. Yet another potential advantage of some embodiments is that reduction of the amount of Portland cement can reduce the carbon footprint of the cementing operation.

Embodiments of the settable compositions may comprise kiln dust. Kiln dust, as that term is used herein, refers to a solid material generated as a by-product of the heating of certain materials in kilns. The term "kiln dust" as used herein is intended to include kiln dust made as described herein and equivalent forms of kiln dust. Kiln dust typically exhibits cementitious properties in that can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. Disposal of the cement kiln dust can add undesirable costs to the manufacture of the cement, as well as the environmental concerns associated with its disposal. The chemical analysis of the cement kiln dust from various cement manufactures varies depending on a number of factors, including the particular kiln feed, the efficiencies of the cement production operation, and the associated dust collection systems. Cement kin dust generally may comprise a variety of oxides, such as $SiO_2$, $Al_2O_3$, $Fe_2O_3$, $CaO$, $MgO$, $SO_3$, $Na_2O$, and $K_2O$. Problems may also be associated with the disposal of lime kiln dust, which may be generated as a by-product of the calcination of lime. The chemical analysis of lime kiln dust from various lime manufacturers varies depending on a number of factors, including the particular limestone or dolomitic limestone feed, the type of kiln, the mode of operation of the kiln, the efficiencies of the lime production operation, and the associated dust collection systems. Lime kiln dust generally may comprise varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides.

The kiln dust may be included in the settable compositions in an amount sufficient to provide, for example, the desired compressive strength, among other properties. In some embodiments, the kiln dust may be present in the settable compositions in an amount in the range of from about 1% to about 99% by weight of cementitious components ("% bwoc"). The term "cementitious components" refers to the components, or a combination thereof, of the settable compositions that hydraulically set, or otherwise harden, to develop compressive strength, including, for example, kiln dust, Portland cement, fly ash, natural pozzolans (e.g., pumice), slag, vitrified shale, metakaolin, rice husk ash, and the like. The cementitious components in some embodiments may be present in the settable composition in an amount of from about 25% to about 75% by weight of the settable composition. The kiln dust may be present in an amount, for example, ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, or about 90% bwoc. In specific embodiments, the kiln dust may be present in the settable compositions in an amount in the range of from about 5% to 90% bwoc, from about 20% to about 50%, or from about 20% to about 30% bwoc. One of ordinary skill in the art, with the benefit of this disclosure, should recognize the appropriate amount of the kiln dust to include for a chosen application.

In some embodiments, the settable compositions may comprise wollastonite. Wollastonite is generally a calcium inosilicate mineral used in industrial applications, such as ceramics, friction products, metal making, paint filler, and plastics. Wollastonite may be mined in a number of different locations throughout the world and then processed for use in industrial applications. Wollastonite may be considered a cementitious component as can set and harden in the presence of silica, lime and water. The wollastonite used in some embodiments may have a mean particle size in a range of from about 1 micron to about 200 microns, and, alternatively, from about 5 microns to about 100 microns. The wollastonite may be included in embodiments of the settable compositions in an amount suitable for a particular application. In some embodiments, the wollastonite may be present in the settable compositions in an amount in a range of from about 1% to about 75% bwoc. In particular embodiments, the wollastonite may be present in an amount ranging between any of and/or including any of 5%, about 10%, about 15%, about 20%, about 25%, about 30%, about 35%, about 40%, about 45%, about 50%, about 55%, about 60%, about 65%, about 70%, or about 75% bwoc. In specific embodiments, wollastonite may be present in the settable compositions in an amount in the range of from about 5% to 50% bwoc or from about 20% to about 30% bwoc. One of ordinary skill, with the benefit of this disclosure, should recognize the amount of the wollastonite to include for a chosen application.

The water used in embodiments of the settable compositions may include, for example, freshwater, saltwater (e.g., water containing one or more salts dissolved therein), brine (e.g., saturated saltwater produced from subterranean formations), seawater, or any combination thereof. Generally, the water may be from any source, provided, for example, that it does not contain an excess of compounds that may undesirably affect other components in the settable composition. In some embodiments, the water may be included in an amount sufficient to form a pumpable slurry. In some embodiments, the water may be included in the settable compositions in an amount in a range of from about 40% to about 200% bwoc. In some embodiments, the water may be included in an amount in a range of from about 40% to about 150% bwoc.

In some embodiments, the settable compositions may further comprise a Portland cement, including, but not limited to, those classified as Class A, C, G and H cements according to American Petroleum Institute, API Specification for Materials and Testing for Well Cements, API Specification 10, Fifth Ed., Jul. 1, 1990. In addition, in some embodiments, Portland cements suitable for use in some embodiments may be classified as ASTM Type I, II, or III. Where present, the Portland cement generally may be included in the settable compositions in an amount sufficient to provide the desired compressive strength, density, and/or cost. In some embodiments, the Portland cement may be present in the settable compositions in an amount in the range of from about 1% to about 75% bwoc. For example, the hydraulic cement may be present in an amount ranging between any of and/or including any of about 1%, about 5%, about 10%, about 20%, about 30%, about 40%, about 50%, about 60%, about 70%, or about 75% bwoc.

Other optional additives may be included in embodiments of the settable compositions, including, but not limited to, fly ash, slag, shale (e.g., vitrified shale), zeolite, metakaolin, pumice, perlite, lime, silica (e.g., amorphous silica, crystalline silica), rice husk ash, small-particle size cement, and combinations thereof. As used herein, the term "small-particle size cement" refers to a cement having a particle size (or d50) no larger than about 5 microns, for example, in a range of about 1 micron to about 5 microns. Where present, these optional additives individually may be included in the settable compositions in an amount in a range of from about 0.1% to about 90% bwoc. For example, one or more of the optional additives may be individually be included in an amount ranging between any of and/or including any of about 5%, about 10%, about 15%, about 20%, about 25%, about 30%, about 35%, about 40%, about 45%, about 50%, about 55%, about 60%, about 65%, about 70%, about 75%, about 80%, about 85%, or about 90% bwoc. One of ordinary skill in the art, with the benefit of this disclosure, will recognize the appropriate amount of the optional to include for a chosen application.

Other additives suitable for use in cementing operations may also be added to embodiments of the settable compositions as desired for a particular application. Examples of such additives include, but are not limited to, dispersants, strength-retrogression additives, set accelerators, set retarders, weighting agents, lightweight additives, gas-generating additives, mechanical property enhancing additives, lost-circulation materials, fluid loss control additives, foaming agents, defoaming agents, oil-swellable particles, water-swellable particles, thixotropic additives, and any combination thereof. Specific examples of these, and other, additives include crystalline silica, fumed silica, silicates, salts, fibers, hydratable clays, microspheres, diatomaceous earth, elastomers, elastomeric particles, resins, latex, any combination thereof, and the like. A person having ordinary skill in the art, with the benefit of this disclosure, will readily be able to determine the type and amount of additive useful for a particular application and desired result.

Dispersants may be included in embodiments of the settable compositions. Where present, the dispersant should act, among other things, to control the rheology of the settable composition. While a variety of dispersants known to those skilled in the art may be used in some embodiments, examples of suitable dispersants include naphthalene sulfonic acid condensate with formaldehyde; acetone, formaldehyde, and sulfite condensate; melamine sulfonate condensed with formaldehyde; any combination thereof.

Strength-retrogression additives may be included in embodiments of the settable composition to, for example, prevent the retrogression of strength after the settable composition has been allowed to develop compressive strength when the settable composition is exposed to high temperatures. These additives may allow the settable compositions to form as intended, preventing cracks and premature failure of the cementitious composition. Examples of suitable strength-retrogression additives may include, but are not limited to, amorphous silica, coarse grain crystalline silica, fine grain crystalline silica, or a combination thereof.

Set accelerators may be included in embodiments of the settable compositions to, for example, increase the rate of setting reactions. Control of setting time may allow for the ability to adjust to well bore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof.

Set retarders may be included in embodiments of the settable compositions to, for example, increase the thickening time of the settable compositions. Examples of suitable set retarders include, but are not limited to, ammonium, alkali metals, alkaline earth metals, borax, metal salts of calcium lignosulfonate, carboxymethyl hydroxyethyl cellulose, sulfoalkylated lignins, hydroxycarboxy acids, copolymers of 2-acrylamido-2-methylpropane sulfonic acid salt and acrylic acid or maleic acid, saturated salt, or a combination thereof. One example of a suitable sulfoalkylated lignin comprises a sulfomethylated lignin.

Weighting agents may be included in embodiments of the settable compositions to, for example, increase the density of the settable compositions. Examples of suitable weighting agents include, but not limited to, ground barium sulfate, barite, hematite, calcium carbonate, siderite, llmenite, manganese oxide, sand, salt, or a combination thereof.

Lightweight additives may be included in embodiments of the settable compositions to, for example, decrease the density of the settable compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in embodiments of the settable compositions to release gas at a predetermined time, which may be beneficial to prevent gas migration from the formation through the settable composition before it hardens. The generated gas may combine with or inhibit the permeation of the settable composition by formation gas. Examples of suitable gas-generating additives include, but are not limited to, metal particles (e.g., aluminum powder) that react with an alkaline solution to generate a gas.

Mechanical-property-enhancing additives may be included in embodiments of the settable compositions to, for example, ensure adequate compressive strength and long-term structural integrity. These properties can be affected by the strains, stresses, temperature, pressure, and impact effects from a subterranean environment. Examples of mechanical-property-enhancing additives include, but are not limited to, carbon fibers, glass fibers, metal fibers, mineral fibers, silica fibers, polymeric elastomers, and latexes.

Lost-circulation materials may be included in embodiments of the settable compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, formica, corncobs, and cotton hulls.

Fluid-loss-control additives may be included in embodiments of the settable compositions to, for example, decrease the volume of fluid that is lost to the subterranean formation. Properties of the settable compositions may be significantly influenced by their water content. The loss of fluid can subject the settable compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Foaming agents may be included in embodiments of the settable compositions to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZoneSealant™ 2000 agent, available from Halliburton Energy Services, Inc.

Defoaming additives may be included in embodiments of the settable compositions to, for example, reduce tendency for the settable composition to foam during mixing and pumping of the settable compositions. Examples of suitable defoaming additives include, but are not limited to, polyol silicone compounds. Suitable defoaming additives are available from Halliburton Energy Services, Inc., under the product name D-AIR™ defoamers.

Thixotropic additives may be included in embodiments of the settable compositions to, for example, provide a settable composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art will appreciate that the settable compositions generally should have a density suitable for a particular application. By way of example, the settable composition may have a density of about 4 pounds per gallon ("lb/gal") to about 20 lb/gal. In certain embodiments, the settable compositions may have a density of from about 8 lb/gal to about 17 lb/gal. Embodiments of the settable compositions may be foamed or unfoamed or may comprise other means to reduce their densities, such as hollow microspheres, low-density elastic beads, or other density-reducing additives known in the art. In some embodiments, the settable compositions may be foamed with one or more foaming additives and a gas. Those of ordinary skill in the art, with the benefit of this disclosure, should recognize the appropriate density for a particular application.

The components of the settable composition may be combined in any order desired to form a settable composition that can be placed into a subterranean formation. In addition, the components of the settable compositions may be combined using any mixing device compatible with the composition, including a bulk mixer, recirculating tub, or jet mixer, for example. In some embodiments, the settable compositions may be prepared by combining the dry components with water. Other additives may be combined with the water before it is added to the dry components. In some embodiments, the solid components may be dry blended prior to their combination with the water. For example, a dry blend may be prepared that comprises the wollastonite, kiln dust, and optional additive, such as the Portland cement, among others. Other suitable techniques may be used for preparation of the settable compositions as will be appreciated by those of ordinary skill in the art in accordance with certain embodiments.

In some embodiments, the settable compositions may develop a desirable compressive strength in the well bore annulus for subterranean cementing operations. Compressive strength is generally the capacity of a material or structure to withstand axially directed pushing forces. The compressive strength may be measured at a specified time after the settable composition has been positioned and the settable composition is maintained under specified temperature and pressure conditions. Compressive strength can be measured by either a destructive method or non-destructive method. The destructive method physically tests the strength of set compositions at various points in time by crushing the samples in a compression-testing machine. The compressive strength is calculated from the failure load divided by the cross-sectional area resisting the load and is reported in units of pound-force per square inch (psi). Non-destructive methods typically may employ an Ultrasonic Cement Analyzer ("UCA"), available from Fann Instrument Company, Houston, Tex. Compressive strengths may be determined in accordance with API RP 10B-2, *Recommended Practice for Testing Well Cements*, First Edition, July 2005.

By way of example, embodiments of the settable compositions may develop a 72-hour compressive strength in the subterranean formation in a range of from about 250 psi to about 10,000 psi and, alternatively, from about 800 psi about 2,000 psi. In some embodiments, the 72-hour compressive strength may be characterized as the destructive compressive strength as measured at atmospheric pressure and temperatures in a range of from about 50° F. to about 400° F., alternatively, in a range of from about 80° F. to about 250° F.

Embodiments of the settable compositions may be used in a variety of applications, including subterranean cementing applications such as primary and remedial cementing, among others. Embodiments may include providing a settable composition and allowing the settable composition to set. Embodiments of the settable compositions may comprise wollastonite, kiln dust, and water. Additional additives may be included in the settable compositions, as described above, for example. As used herein, introducing the settable composition into a subterranean formation includes introduction into any portion of the subterranean formation, including, without limitation, into a well bore drilled into the subterranean formation, into a near well bore region surrounding the well bore, or into both. Moreover, introducing the settable composition into the subterranean formation is intended to encompass introduction of the settable composition into one or more subterranean formations that are penetrated by the well bore.

In primary-cementing embodiments, for example, a settable composition may be introduced into a well-bore annulus and allowed to set in the well-bore annulus to form a hardened mass. The well-bore annulus may include, for example, an annular space between a conduit (e.g., pipe string, surface casing, intermediate casing, production casing, liner, etc.) and a wall of a well bore or between the conduit and a larger conduit in the well bore. Generally, in most instances, the hardened mass should fix the conduit in the well bore.

In remedial-cementing embodiments, a settable composition may be used, for example, in squeeze-cementing operations or in the placement of plugs. By way of example, the settable composition may be placed in a well bore to plug a void or crack in the formation, in a gravel pack, in the conduit, in the cement sheath, and/or a microannulus between the cement sheath and the conduit. In another embodiment, the settable composition may be placed into a well bore to form a plug in the well bore with the plug, for example, sealing the well bore.

Referring now to FIG. 1, preparation a settable composition in accordance with example embodiments will now be described. FIG. 1 illustrates a system 2 for preparation of a settable composition and delivery to a well bore in accordance with certain embodiments. As shown, the settable composition may be mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the wollastonite/pumice with the water as it is being pumped to the well bore.

Figure 2A:
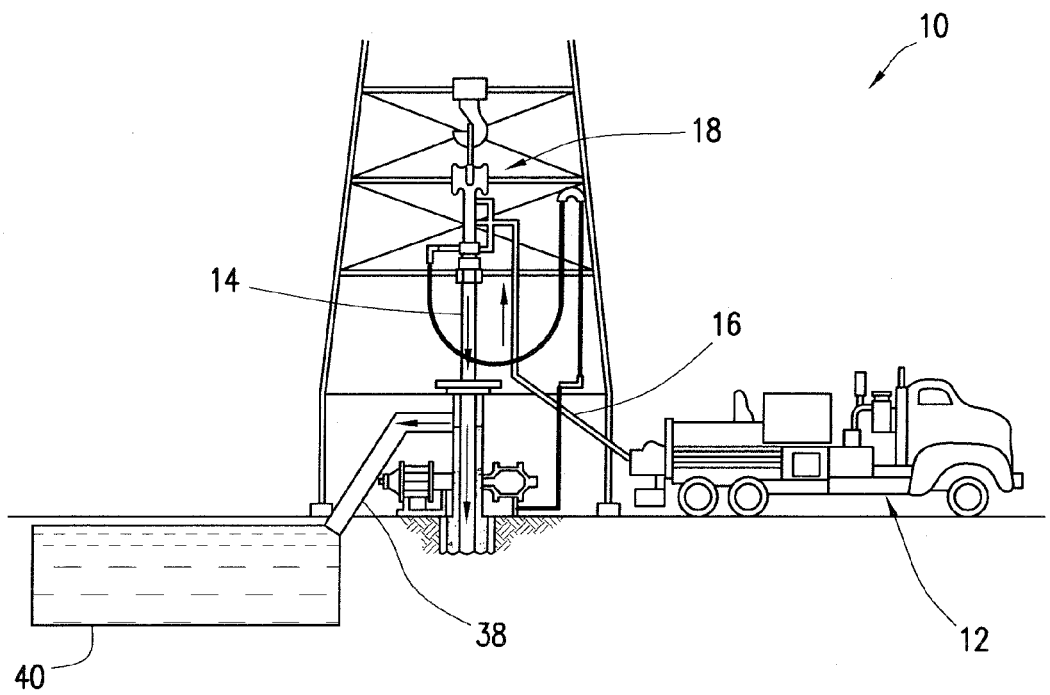
FIG. 2A illustrates surface equipment that may be used in placement of a settable composition in a well bore in accordance with certain embodiments.

An example technique for placing a settable composition into a subterranean formation will now be described with reference to FIGS. 2A and 2B. FIG. 2A illustrates surface equipment 10 that may be used in placement of a settable composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure.

As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a settable composition 14 through a feed pipe 16 and to a cementing head 18 which conveys the settable composition 14 downhole.

Figure 2B:
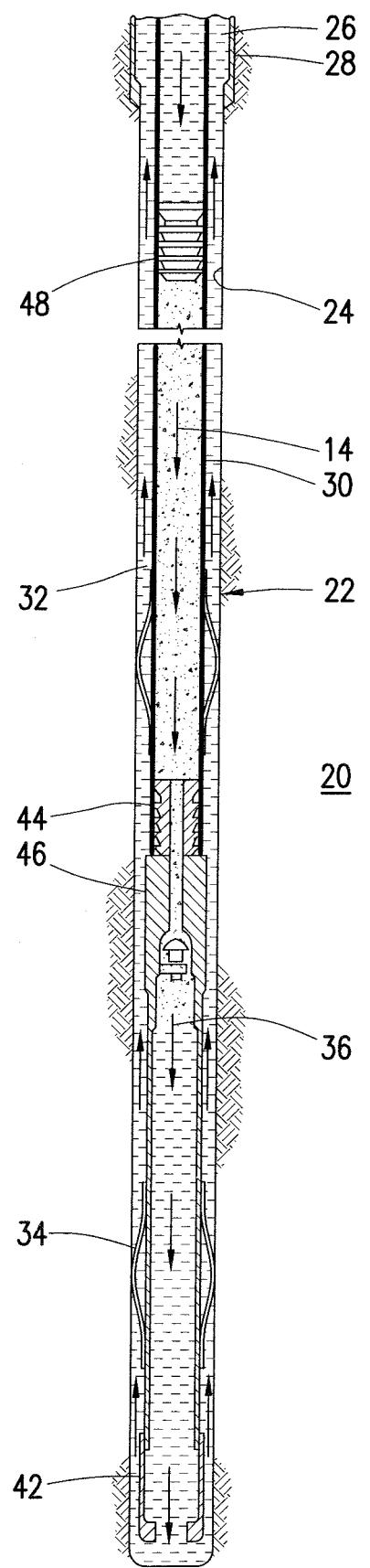
FIG. 2B illustrates placement of a settable composition into a well bore annulus in accordance with certain embodiments.

Turning now to FIG. 2B, the settable composition 14 may be placed into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiment, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.), shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 2B, the settable composition 14 may be pumped down the interior of the casing 30. The settable composition 14 may be allowed to flow down the interior of the casing 30 through the casing shoe 42 at the bottom of the casing 30 and up around the casing 30 into the well bore annulus 32. The settable composition 14 may be allowed to set in the well bore annulus 32, for example, to form a cement sheath that supports and positions the casing 30 in the well bore 22. While not illustrated, other techniques may also be utilized for introduction of the settable composition 14. By way of example, reverse circulation techniques may be used that include introducing the settable composition 14 into the subterranean formation 20 by way of the well bore annulus 32 instead of through the casing 30.

As it is introduced, the settable composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 2A. Referring again to FIG. 2B, a bottom plug 44 may introduced into the well bore 22 ahead of the settable composition 14, for example, to separate the settable composition 14 from the fluids 36 that may be inside the casing 30 prior to cementing. After the bottom plug 44 reaches the landing collar 46, a diaphragm or other suitable device rupture to allow the settable composition 14 through the bottom plug 44. In FIG. 2B, the bottom plug 44 is shown on the landing collar 46. In the illustrated embodiment, a top plug 48 may be introduced into the well bore 22 behind the settable composition 14. The top plug 48 may separate the settable composition 14 from a displacement fluid 50 and also push the settable composition 14 through the bottom plug 44.

The exemplary settable compositions disclosed herein may directly or indirectly affect one or more components or pieces of equipment associated with the preparation, delivery, recapture, recycling, reuse, and/or disposal of the disclosed settable compositions. For example, the disclosed settable compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary settable compositions. The disclosed settable compositions may also directly or indirectly affect any transport or delivery equipment used to convey the settable compositions to a well site or downhole such as, for example, any transport vessels, conduits, pipelines, trucks, tubulars, and/or pipes used to compositionally move the settable compositions from one location to another, any pumps, compressors, or motors (e.g., topside or downhole) used to drive the settable compositions into motion, any valves or related joints used to regulate the pressure or flow rate of the settable compositions, and any sensors (i.e., pressure and temperature), gauges, and/or combinations thereof, and the like. The disclosed settable compositions may also directly or indirectly affect the various downhole equipment and tools that may come into contact with the settable compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present invention, the following examples of some of the preferred embodiments are given. In no way should such examples be read to limit, or to define, the scope of the invention.

Example 1

The following series of tests was performed to evaluate the force resistance properties of settable compositions comprising wollastonite, cement kiln dust, and Portland cement. Three different sample settable compositions, designated Samples 1 to 3, were prepared that comprised cement kiln dust, wollastonite, Portland Class H cement and sufficient water to provide the density indicated in the table below. The samples were prepared by combining these solid components with water while mixing in a Waring blender. The concentrations of the wollastonite, cement kiln dust, and Portland Class H cement were varied as indicated in the table below. The wollastonite was supplied Seaforth Mineral & Ore Co., East Liverpool, Ohio. The cement kiln dust was supplied Holcem Cement Company, Ada, Okla.

After preparation, the samples were allowed to cure for seventy-two hours in 2" by 4" metal cylinders that were placed in a water bath at 170° F. to form set cylinders and the resulting set cylinders were tested for mechanical properties in accordance with API RP 10B-2. The mixability was also observed and recorded. A slurry that was thick indicates that there was insufficient water. A slurry that was mixable indicates proper weight and proper amount of water.

The results of the tests are set forth in the table below. The data reported in the table below is the average of 3 tests for each of sample. The abbreviation "% bwoc" indicates the weight percent of the particular component by weight of the cementitious components, which were the cement kiln dust, the wollastonite, and the Portland Class H Cement. The abbreviation "gal/sk" indicates the weight of the particular component per 94 pound sack of cementitious components. The abbreviation "psi" refers to pounds per square inch.

TABLE 1

Compressive Strength Tests

| Sample No. | Density (lb/gal) | Cementitious Components Material | % bwoc | Water (gal/sk) | 72-Hr Compressive Strength (psi) | Mixability |
|---|---|---|---|---|---|---|
| 1 | 14.2 | Cement Kiln Dust | 25 | 7.0261 | 876 | Slurry Mixable |
|   |      | Wollastonite | 25 |   |   |   |
|   |      | Class H Cement | 50 |   |   |   |
| 2 | 14.5 | Cement Kiln Dust | 25 | 6.5039 | 1136 | Slurry Thick |
|   |      | Wollastonite | 25 |   |   |   |
|   |      | Class H Cement | 50 |   |   |   |
| 3 | 14.5 | Cement Kiln Dust | 50 | 6.1521 | 611 | Slurry Mixable |
|   |      | Wollastonite | 25 |   |   |   |
|   |      | Class H Cement | 25 |   |   |   |

Example 2

An additional test was performed to evaluate the force resistance properties of foamed settable compositions comprising wollastonite, cement kiln dust, and Portland cement. A base sample composition was prepared that comprised cement kiln dust, wollastonite, Portland Class H cement and sufficient water to have a density of 14.2 lb/gal. The base sample was prepared by combining the solid components with water while mixing in a Waring blender. The wollastonite was supplied Seaforth Mineral & Ore Co., East Liverpool, Ohio. The cement kiln dust was supplied Holcem Cement Company, Ada, Okla. A foaming agent (ZoneSealant™ 2000 agent, Halliburton Energy Services, Inc.) was then added to the base sample composition in an amount of 2% bwoc. Next, the base composition was foamed down to 12.5 lb/gal by mixing in a Waring blender.

After preparation, the sample was allowed to cure for seventy-two hours in 2" by 4" metal cylinders that were placed in a water bath at 170° F. to form set cylinders and the resulting set cylinders were tested for mechanical properties in accordance with API RP 10B-2. The result is set forth in the table below. The data reported in the table below is the average of 3 tests for the sample. The abbreviation "% bwoc" indicates the weight percent of the particular component by weight of the cement components, which were the cement kiln dust, the wollastonite, and the Portland Class H Cement.

TABLE 2

Compressive Strength Tests

| Sample No. | Density (lb/gal) | Cementitious Components Material | % bwoc | Foaming Agent (% bwoc) | 72-Hr Compressive Strength (psi) |
|---|---|---|---|---|---|
| 4 | 12.5 | Cement Kiln Dust | 25 | 2 | 190.3 |
|   |      | Wollastonite | 25 |   |   |
|   |      | Class H Cement | 50 |   |   |

Example 3

An additional test was performed to evaluate the force resistance properties of a settable composition comprising wollastonite, cement kiln dust, and hydrated lime. A sample settable composition was prepared that comprised cement kiln dust, wollastonite, hydrated lime, a dispersant, and sufficient water to provide the density indicated in the table below. The sample was prepared by combining the solid components with water while mixing in a Waring blender. The wollastonite was supplied Seaforth Mineral & Ore Co., East Liverpool, Ohio. The cement kiln dust was supplied Holcem Cement Company, Ada, Okla. The dispersant is available from Halliburton Energy Services, Inc., as CFR-3™ dispersant.

After preparation, the sample was allowed to cure for seventy-two hours in 2" by 4" metal cylinders that were placed in a water bath at 170° F. to form set cylinders and the resulting set cylinders were tested for mechanical properties in accordance with API RP 10B-2. The result is set forth in the table below. The data reported in the table below is the average of 3 tests of the sample. The abbreviation "% bwoc" indicates the weight percent of the particular component by weight of the cement components, which were the cement kiln dust, wollastonite, and hydrated lime.

TABLE 3

Compressive Strength Tests

| Sample No. | Density (lb/gal) | Cementitious Components Material | % bwoc | Dispersant (% bwoc) | Water (gal/sk) | 72-Hr Compressive Strength (psi) | Mixability |
|---|---|---|---|---|---|---|---|
| 5 | 14.2 | Cement Kiln Dust<br>Wollastonite<br>Hydrated Lime | 45.5<br>45.5<br>9 | 0.6 | 7.0454 | 207 | Slurry Mixable After Adding Dispersant |

Example 4

The following series of tests was performed to evaluate the force resistance properties of settable compositions comprising wollastonite, cement kiln dust, and Portland cement, and optional additives. Five different sample settable compositions, designated Samples 6 to 10, were prepared that comprised cement kiln dust, wollastonite, Portland Class H cement, one or more optional additives and sufficient water to provide the density indicated in the table below. The samples were prepared by combining the solid components with water while mixing in a Waring blender. A dispersant (CFR-3™ dispersant) was also included in Samples 6 and 10. The concentrations of the wollastonite, cement kiln dust, Portland Class H cement, and optional additive(s) were varied as indicated in the table below. The wollastonite was supplied Seaforth Mineral & Ore Co., East Liverpool, Ohio. The cement kiln dust was supplied Holcem Cement Company, Ada, Okla.

The optional additives included in the samples were metakaolin, fly ash, silica flour, vitrified shale, and fumed silica. Sample 6 included metakaolin supplied by BASF Corporation, Floraham Park, N.J. Sample 7 included fly ash supplied by Fairfield Poz, Fairfield, Tex. Samples 8 included silica flour available from Halliburton Energy Services, as SSA-1™ strength-stabilizing agent. Sample 9 included shale available from TXI, Midloathian, Tex. Sample 10 included fumed silica available from Halliburton Energy Services, Inc., as Silicalite™ cement additive After preparation, the samples were allowed to cure for seventy-two hours in 2" by 4" metal cylinders that were placed in a water bath at 170° F. to form set cylinders and the resulting set cylinders were tested for mechanical properties in accordance with API RP 10B-2. The results of the tests are set forth in the table below. The data reported in the table below is the average of 3 tests for each of the samples. The abbreviation "% bwoc" indicates the weight percent of the particular component by weight of the listed cementitious components.

TABLE 4

Compressive Strength Tests

| Sample No. | Density (lb/gal) | Cementitious Components Material | % bwoc | Dispersant (% bwoc) | Water (gal/sk) | 72-Hr Compressive Strength (psi) | Mixability |
|---|---|---|---|---|---|---|---|
| 6 | 14.5 | Cement Kiln Dust<br>Wollastonite<br>Class H Cement<br>Metakaolin | 25<br>25<br>25<br>25 | 0.6 | 6.1521 | 2060 | Slurry Mixable |
| 7 | 14.5 | Cement Kiln Dust<br>Wollastonite<br>Class H Cement<br>Fly Ash | 25<br>25<br>25<br>25 | — | 5.8950 | 1965 | Slurry Mixable |
| 8 | 14.5 | Cement Kiln Dust<br>Wollastonite<br>Class H Cement<br>Silica Flour | 25<br>25<br>25<br>25 | — | 6.0688 | 548 | Slurry Mixable |
| 9 | 14.5 | Cement Kiln Dust<br>Wollastonite<br>Class H Cement<br>Shale | 25<br>25<br>25<br>25 | — | 5.9899 | 1415 | Slurry Mixable |
| 10 | 14.5 | Cement Kiln Dust<br>Wollastonite<br>Class H Cement<br>Fumed Silica | 25<br>25<br>25<br>25 | 1 | 6.4124 | 1108 | Difficult to mix and pour into cylinders |

It should be understood that the compositions and methods are described in terms of "comprising," "containing," or "including" various components or steps, the compositions and methods can also" "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recite. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of cementing comprising:
providing a settable composition comprising kiln dust, wollastonite, and water; wherein the wollastonite is present in the settable composition in an amount in a range of from about 1% to about 75% by weight of a total amount of cementitious components present in the settable composition, wherein the kiln dust is present in the settable composition in an amount in a range of from about 5% to about 90% by weight of a total amount of cementitious components present in the settable composition; and
allowing the settable composition to set, wherein the settable composition is introduced into a subterranean formation.

2. The method of claim 1 wherein the kiln dust comprises at least one partially calcined kiln feed selected from the group consisting of cement kiln dust, lime kiln dust, and a combination thereof.

3. The method of claim 1 wherein the kiln dust comprises $SiO_2$, $Al_2O_3$, $Fe_2O_3$, $CaO$, $MgO$, $SO_3$, $Na_2O$, and $K_2O$.

4. The method of claim 1 wherein the kiln dust is present in the settable composition in an amount in a range of from about 5% to about 50% by weight of a total amount of cementitious components present in the settable composition.

5. The method of claim 1 wherein the settable composition further comprises Portland cement.

6. The method of claim 5 wherein the Portland cement is present in the settable composition in an amount in a range of from about 1% to about 75% by weight of a total amount of cementitious components present in the settable composition.

7. The method of claim 6 wherein the Portland cement is present in the settable composition in an amount in a range of from about 10% to about 50% by weight of a total amount of cementitious components present in the settable composition, wherein the kiln dust is present in the settable composition in an amount in a range of from about 10% to about 50% by weight of the total amount of cementitious components present in the settable composition, and wherein the wollastonite is present in the settable composition in an amount in a range of from about 10% to about 50% by weight of the total amount of cementitious components present in the settable composition.

8. The method of claim 1 wherein the water is present in an amount sufficient to form a pumpable slurry.

9. The method of claim 1 wherein the settable composition further comprises at least one additive selected from the group consisting of fly ash, slag, shale, zeolite, metakaolin, pumice, perlite, lime, silica, rice husk ash, small-particle size cement, and any combination thereof.

10. The method of claim 1 wherein the settable composition further comprises at least one additive selected from the group consisting of a dispersant, a strength-retrogression additive, a set accelerator, a set retarder, a weighting agent, a lightweight additive, a gas-generating additive, a Mechanical property enhancing additive, a lost-circulation material, a fluid loss control additive, a foaming additive, a defoaming additive, an oil-swellable particle, a water-swellable particle, a thixotropic additive, crystalline silica, fumed silica, silicates, salts, fibers, hydratable clays, microspheres, diatomaceous earth, elastomers, elastomeric particles, resins, latex and any combination thereof.

11. The method of claim 1 wherein the settable composition is foamed with a foaming agent and a gas.

12. The method of claim 1 wherein the settable composition is used in primary cementing.

13. The method of claim 1 wherein the settable composition is used in remedial cementing.

14. The method of claim 1 wherein the wollastonite is present in the settable composition in an amount of about 10% to about 75% by weight of a total amount of cementitious components present in the settable composition.

15. A method of cementing comprising:
introducing a settable composition into a well bore annulus, wherein the settable composition comprises cement kiln dust, wollastonite, Portland cement, water, and an additive selected from the group consisting of fly ash, slag, shale, zeolite, metakaolin, pumice, perlite, lime, silica, rice husk ash, small-particle size cement, and any combination thereof; wherein the wollastonite is present in the settable composition in an amount in a range of from about 1% to about 75% b weight of a total amount of cementitious components present in the settable composition, wherein the kiln dust is present in the settable composition in an amount in a range of from about 5% to about 90% by weight of a total amount of cementitious components present in the settable composition; and
allowing the settable composition to set.

16. The method of claim 15 wherein the Portland cement is present in the settable composition in an amount in a range of from about 10% to about 50% by weight of a total amount of cementitious components present in the settable composition, wherein the cement kiln dust is present in the settable composition in an amount in a range of from about 10% to about 50% by weight of the total amount of cementitious components present in the settable composition, and wherein the wollastonite is present in the settable composition in an amount in a range of from about 10% to about 50% by weight of the total amount of cementitious components present in the settable composition.

17. The method of claim 16 wherein the settable composition comprises the metakaolin in an amount in a range of from about 10% to about 50% by weight of the total amount of cementitious components present in the settable composition.

18. The method of claim 15 wherein the woliastonite is present in the settable composition in an amount of about 10% to about 75% by weight of a total amount of cementitious components present in the settable composition.

\* \* \* \* \*